(12) United States Patent
Han et al.

(10) Patent No.: US 12,474,616 B2
(45) Date of Patent: Nov. 18, 2025

(54) LIGHT ROUTE CONTROL MEMBER AND DISPLAY DEVICE COMPRISING SAME

(71) Applicant: LG INNOTEK CO., LTD., Seoul (KR)

(72) Inventors: Young Ju Han, Seoul (KR); Byung Sook Kim, Seoul (KR); Hyeon Ji Hong, Seoul (KR); Won Seok Choi, Seoul (KR); Jin Gyeong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 644 days.

(21) Appl. No.: 17/758,837

(22) PCT Filed: Jan. 12, 2021

(86) PCT No.: PCT/KR2021/000364
§ 371 (c)(1),
(2) Date: Jul. 14, 2022

(87) PCT Pub. No.: WO2021/145632
PCT Pub. Date: Jul. 22, 2021

(65) Prior Publication Data
US 2023/0077281 A1 Mar. 9, 2023

(30) Foreign Application Priority Data
Jan. 14, 2020 (KR) .................... 10-2020-0004845
Jan. 14, 2020 (KR) .................... 10-2020-0004854

(51) Int. Cl.
*G02F 1/1677* (2019.01)
*G02F 1/167* (2019.01)
*G02F 1/1676* (2019.01)

(52) U.S. Cl.
CPC .......... *G02F 1/1677* (2019.01); *G02F 1/167* (2013.01); *G02F 1/1676* (2019.01)

(58) Field of Classification Search
CPC ....... G02F 1/1677; G02F 1/1676; G02F 1/167
(Continued)

(56) References Cited

U.S. PATENT DOCUMENTS 8,072,141 B2  12/2011  Cha et al.
10,712,626 B2  7/2020  Xu et al.
(Continued)

FOREIGN PATENT DOCUMENTS

CN  1947292 A  4/2007
CN  106292092 A  1/2017
(Continued)

OTHER PUBLICATIONS

International Search Report dated Apr. 30, 2021 in International Application No. PCT/KR2021/000364.
(Continued)

*Primary Examiner* — William Choi
(74) *Attorney, Agent, or Firm* — SALIWANCHIK, LLOYD & EISENSCHENK

(57) ABSTRACT

An optical path control member according to an embodiment comprises: a first substrate; a first electrode disposed on the upper part of the first substrate; a second substrate disposed on the first substrate; a second electrode disposed on the lower part of the second substrate; and an optical conversion unit disposed between the first electrode and the second electrode. The optical conversion unit includes partition wall portions and receiving portions that are alternately disposed. The receiving portions change optical transmittance in response to the application of voltage, and include a dispersion and optical conversion particles dispersed in the dispersion. The refractive index ratio of the partition wall portions and the receiving portions is 1:0.95 to 1:1.05.

16 Claims, 11 Drawing Sheets

(58) Field of Classification Search
USPC .......................................................... 359/296
See application file for complete search history.

(56) References Cited

U.S. PATENT DOCUMENTS

| | | |
|---|---|---|
| 2018/0210310 A1 | 7/2018 | Telfer |
| 2018/0356657 A1 | 12/2018 | Xu et al. |
| 2019/0179208 A1 | 6/2019 | Sato et al. |

FOREIGN PATENT DOCUMENTS

| | | | |
|---|---|---|---|
| JP | 2015-114448 A | | 6/2015 |
| JP | 2016-75877 A | | 5/2016 |
| JP | 2019-191407 A | | 10/2019 |
| JP | 2019191220 A | * | 10/2019 |
| JP | 2019-210310 A | | 12/2019 |
| KR | 10-2008-0016308 A | | 2/2008 |
| KR | 10-2009-0069929 A | | 7/2009 |
| KR | 10-2012-0107814 A | | 10/2012 |
| KR | 10-2015-0097332 A | | 8/2015 |
| KR | 10-2015-0125051 A | | 11/2015 |
| KR | 10-2016-0048624 A | | 5/2016 |
| KR | 10-2016-0096263 A | | 8/2016 |
| KR | 10-2017-0055918 A | | 5/2017 |
| KR | 10-2019-0009446 A | | 1/2019 |
| WO | 2018/150673 A1 | | 8/2018 |

OTHER PUBLICATIONS

Supplementary European Search Report dated Jan. 2, 2024 in European Application No. 21741006.7.
Office Action dated Jun. 27, 2023 in Japanese Application No. 2022-542057.
Office Action dated May 26, 2023 in Chinese Application No. 202180009223.2.

* cited by examiner

LIGHT ROUTE CONTROL MEMBER AND DISPLAY DEVICE COMPRISING SAME

CROSS-REFERENCE TO RELATED APPLICATIONS

This application is the U.S. national stage application of International Patent Application No. PCT/KR2021/000364, filed Jan. 12, 2021, which claims the benefit under 35 U.S.C. § 119 of Korean Application Nos. 10-2020-0004845, filed Jan. 14, 2020; and 10-2020-0004854, filed Jan. 14, 2020; the disclosures of each of which are incorporated herein by reference in their entirety.

TECHNICAL FIELD

An embodiment relates to a light route control member having improved light shielding properties in a specific angular range, and a display device including the same.

BACKGROUND ART

A light-shielding film shields transmitting of light from a light source, and is attached to a front surface of a display panel which is a display device used for a mobile phone, a notebook, a tablet PC, a vehicle navigation device, a vehicle touch, etc., so that the light-shielding film adjusts a viewing angle of light according to an incident angle of light to express a clear image quality at a viewing angle needed by a user when the display transmits a screen.

In addition, the light-shielding film may be used for the window of a vehicle, building or the like to shield outside light partially to inhibit glare, or to inhibit the inside from being visible from the outside.

That is, the light-shielding film may be a light route control member that controls a movement path of light, block light in a specific direction, and transmit light in a specific direction. Accordingly, by controlling the light transmission angle by the light-shielding film, it is possible to control the viewing angle of the user.

Meanwhile, such a light-shielding film may be a light-shielding film that can always control the viewing angle regardless of the surrounding environment or the user's environment, and switchable light-shielding film that allows the user to turn on/off the viewing angle control according to the surrounding environment or the user's environment may be distinguished.

Such a switchable light-shielding film may be implemented by adding electrically moving particles to the receiving part in which the light conversion material is disposed, and changing the receiving part into a light transmitting part and a light blocking part by dispersion and aggregation of the particles.

Meanwhile, the receiving part may be divided into a plurality of receiving parts by a plurality of partition wall parts disposed between the receiving parts.

At this time, due to the difference in refractive index between the receiving part and the partition wall part, light may be refracted, reflected, and scattered at the interface between the receiving part and the partition wall part without being incident into the pattern part. Accordingly, there is a problem in that light in a specific angle range is transmitted without being shielded by the pattern part.

Accordingly, as described above, there is a need for a light route control member having a new structure capable of efficiently controlling a change in shielding characteristics due to a difference in refractive index between the partition wall part and the receiving part.

DISCLOSURE

Technical Problem

An embodiment relates to the light route control member having improved shielding properties by controlling the size of the refractive index of a receiving part and a partition wall part, and a display device including the same.

Technical Solution

A light route control member according to an embodiment includes: a first substrate; a first electrode disposed on the first substrate; a second substrate disposed on the first substrate; a second electrode disposed under the second substrate; and a light conversion part disposed between the first electrode and the second electrode, wherein the light conversion part comprises a partition wall part and a receiving part alternately arranged, and the light transmittance of the receiving part is changed according to application of a voltage, and the receiving part includes a dispersion and light conversion particles dispersed in the dispersion, and a refractive index ratio of the partition wall part and the receiving part is 1:0.95 to 1:1.05.

Advantageous Effects

The light route control member according to the embodiment may control the refractive index of the partition wall part and the receiving part of the light conversion part.

In detail, it is possible to minimize the difference in refractive index between the partition wall part and the receiving part, so that light at the interface between the partition wall part and the receiving part is not incident to the interior of the receiving part, but is scattered, reflected, or refracted to inhibit it from moving to the outside.

Accordingly, light is inhibited from being scattered, reflected, or refracted at the interface between the partition wall part and the receiving part, and the light is absorbed by being incident into the receiving part. Accordingly, the transmittance of light transmitted in the lateral direction of the light route control member may be controlled within a desired range.

Accordingly, it is possible to improve the lateral shielding effect of the light route control member by controlling the transmittance in a specific angle range.

In addition, the partition wall part is defined as a first partition wall part below the receiving part and a second partition wall part between the receiving parts. By controlling the refractive index of the first partition wall part to be less than or equal to the refractive index of the second partition wall part, total reflection at the interface between the first partition wall part and the second partition wall part is minimized, and loss of incident light due to total reflection can be minimized.

Accordingly, the front luminance of the light route control member according to the embodiment may be improved.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, a light route control member according to an embodiment will be described with reference to drawings. The light route control member described below relates to a switchable light route control member that drives in various modes according to the movement of electrophoretic particles application of a voltage.

Figure 1:
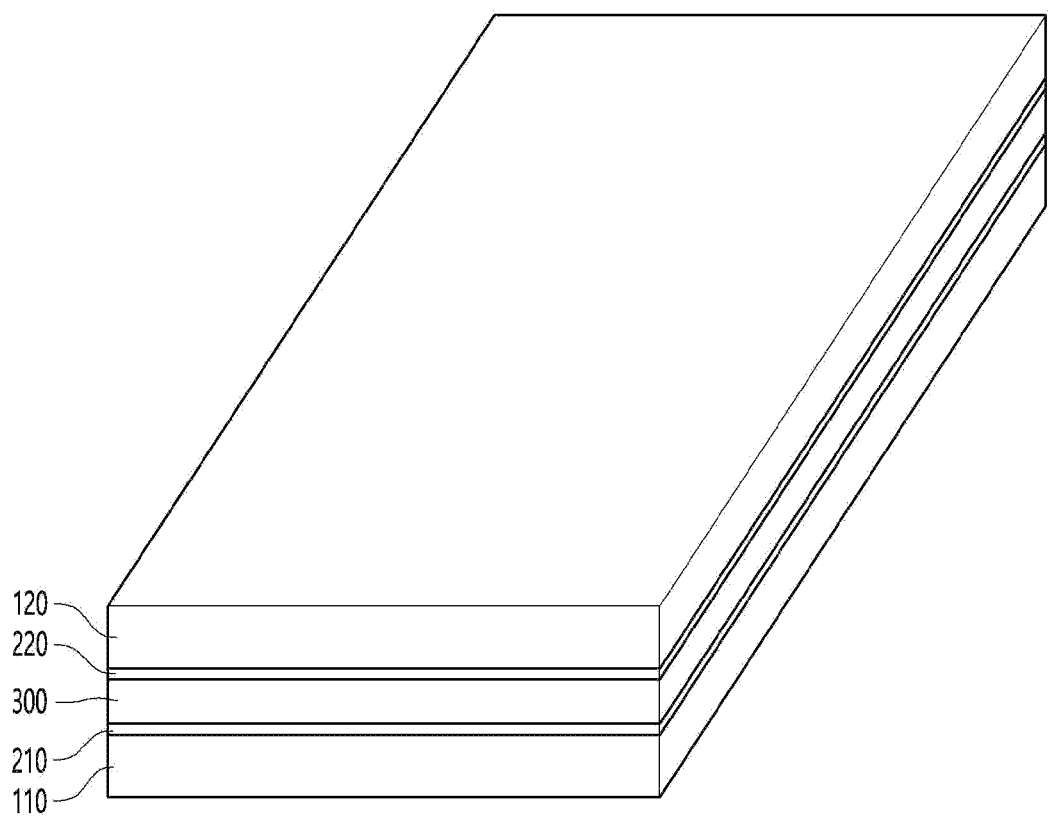
FIG. 1 is a view showing perspective view of a light route control member according to an embodiment.
Figure 2:
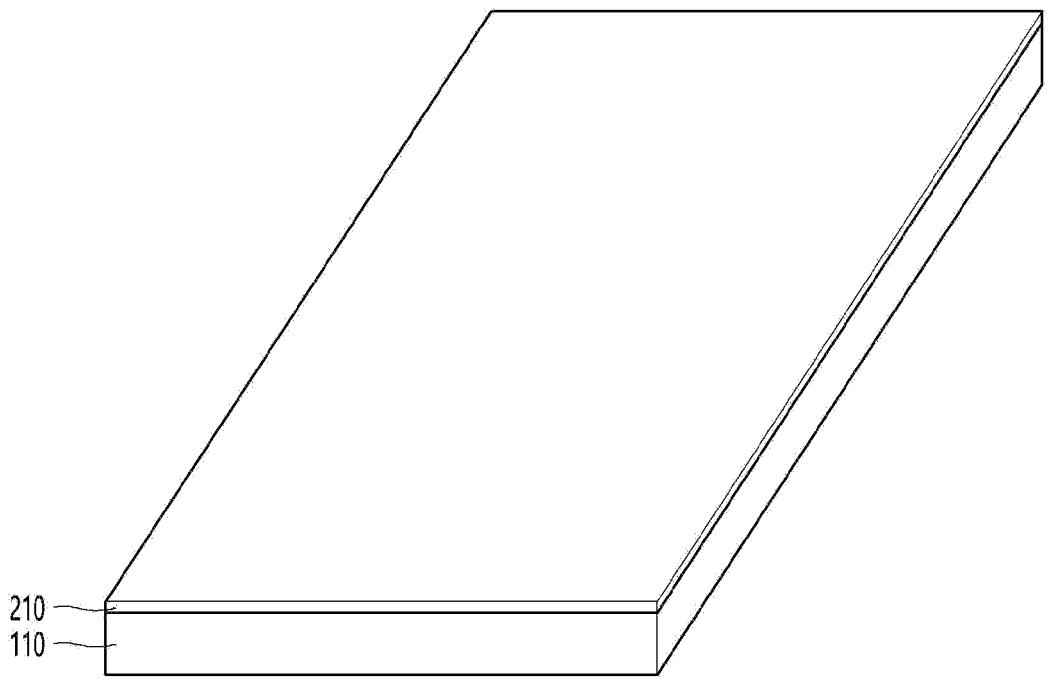
FIGS. 2 and 3 are views showing perspective views of a first substrate and a first electrode and a perspective view of a second substrate and a second electrode of the light route control member according to the embodiment, respectively.
Figure 3:
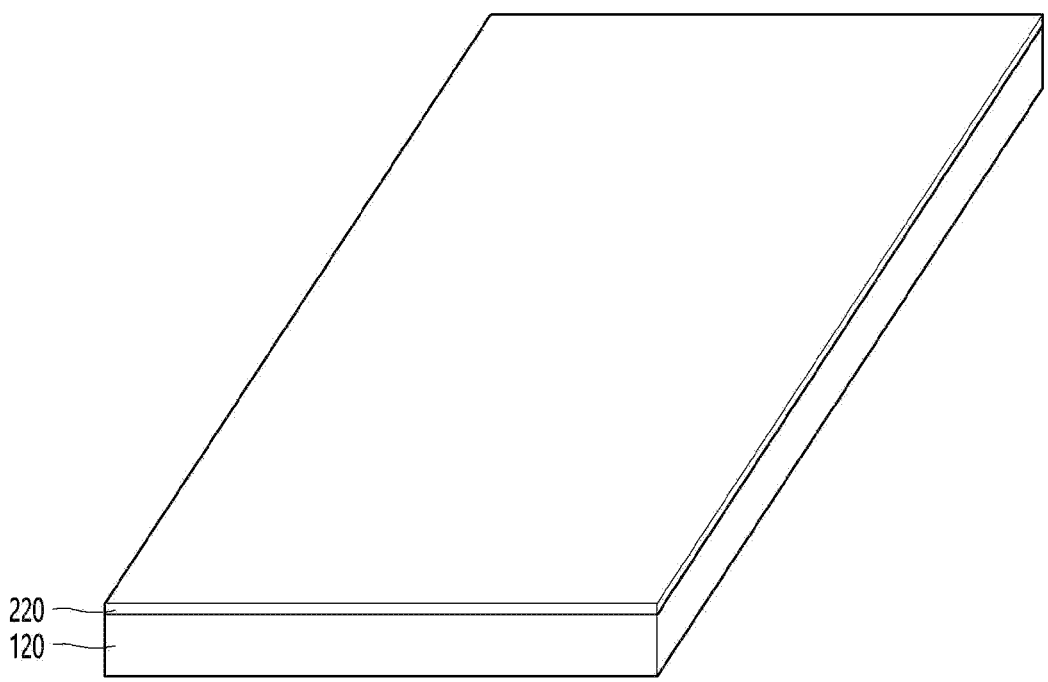

Referring to FIGS. 1 to 3, a light route control member according to an embodiment may include a first substrate 110, a second substrate 120, a first electrode 210, a second electrode 220, and a light conversion part 300.

The first substrate 110 may support the first electrode 210. The first substrate 110 may be rigid or flexible.

In addition, the first substrate 110 may be transparent. For example, the first substrate 110 may include a transparent substrate capable of transmitting light.

The first substrate 110 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the first substrate 110 may be a flexible substrate having flexible characteristics.

Further, the first substrate 110 may be a curved or bended substrate. That is, the light route control member including the first substrate 110 may also be formed to have flexible, curved, or bent characteristics. Accordingly, the light route control member according to the embodiment may be changed to various designs.

The first substrate 110 may have a thickness of 30 µm to 80 µm.

The first electrode 210 may be disposed on one surface of the first substrate 110. In detail, the first electrode 210 may be disposed on an upper surface of the first substrate 110. That is, the first electrode 210 may be disposed between the first substrate 110 and the second substrate 120.

The first electrode 210 may contain a transparent conductive material. For example, the first electrode 210 may contain a metal oxide such as indium tin oxide, indium zinc oxide, copper oxide, tin oxide, zinc oxide, titanium oxide, etc.

The first electrode 210 may be disposed on the first substrate 110 in a film shape. In detail, light transmittance of the first electrode 210 may be about 80% or more.

The first electrode 210 may have a thickness of about 0.1 µm to about 0.5 µm.

Alternatively, the first electrode 210 may contain various metals to realize low resistance. For example, the first electrode 210 may contain at least one metal of chromium (Cr), nickel (Ni), copper (Cu), aluminum (Al), silver (Ag), molybdenum (Mo). gold (Au), titanium (Ti), and alloys thereof.

The first electrode 210 may be disposed on the entire surface of one surface of the first substrate 110. In detail, the first electrode 210 may be disposed as a surface electrode on one surface of the first substrate 110. However, the embodiment is not limited thereto, and the first electrode 210 may be formed of a plurality of pattern electrodes having a predetermined pattern.

For example, the first electrode 210 may include a plurality of conductive patterns. In detail, the first electrode 210 may include a plurality of mesh lines intersecting each other and a plurality of mesh openings formed by the mesh lines.

Accordingly, even though the first electrode 210 contains a metal, visibility may be improved because the first electrode is not visible from the outside. In addition, the light transmittance is increased by the openings, so that the brightness of the light route control member according to the embodiment may be improved.

The second substrate 120 may be disposed on the first substrate 110. In detail, the second substrate 120 may be disposed on the first electrode 210 on the first substrate 110.

The second substrate 120 may contain a material capable of transmitting light. The second substrate 120 may contain a transparent material. The second substrate 120 may contain a material the same as or similar to that of the first substrate 110 described above.

For example, the second substrate 120 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the second substrate 120 may be a flexible substrate having flexible characteristics.

Further, the second substrate 120 may be a curved or bended substrate. That is, the light route control member including the second substrate 120 may also be formed to have flexible, curved, or bent characteristics. Accordingly, the light route control member according to the embodiment may be changed to various designs.

The second substrate 120 may have a thickness of 30 mm to 80 mm.

The second electrode 220 may be disposed on one surface of the second substrate 120. In detail, the second electrode 220 may be disposed on a lower surface of the second substrate 120. That is, the second electrode 220 may be disposed on a surface on which the second substrate 120 faces the first substrate 110. That is, the second electrode 220 may be disposed facing the first electrode 210 on the first substrate 110. That is, the second electrode 220 may be disposed between the first electrode 210 and the second substrate 120.

The second electrode 220 may contain a transparent conductive material. For example, the second electrode 220 may contain a metal oxide such as indium tin oxide, indium zinc oxide, copper oxide, tin oxide, zinc oxide, titanium oxide, etc.

The second electrode 220 may be disposed on the first substrate 110 in a film shape. In addition, the light transmittance of the second electrode 220 may be about 80% or more.

The second electrode 220 may have a thickness of about 0.1 μm to about 0.5 μm.

Alternatively, the second electrode 220 may contain various metals to realize low resistance. For example, the second electrode 220 may contain at least one metal of chromium (Cr), nickel (Ni), copper (Cu), aluminum (Al), silver (Ag), molybdenum (Mo). gold (Au), titanium (Ti), and alloys thereof.

The second electrode 220 may be disposed on the entire surface of one surface of the second substrate 120. In detail, the second electrode 220 may be disposed as a surface electrode on one surface of the second substrate 120. However, the embodiment is not limited thereto, and the second electrode 220 may be formed of a plurality of pattern electrodes having a predetermined pattern.

For example, the second electrode 220 may include a plurality of conductive patterns. In detail, the second electrode 220 may include a plurality of mesh lines intersecting each other and a plurality of mesh openings formed by the mesh lines.

Accordingly, even though the second electrode 220 contains a metal, visibility may be improved because the second electrode 220 is not visible from the outside. In addition, the light transmittance is increased by the openings, so that the brightness of the light route control member according to the embodiment may be improved.

The light conversion part 300 may be disposed between the first substrate 110 and the second substrate 120. In detail, the light conversion part 300 may be disposed between the first electrode 210 and the second electrode 220.

Figure 4:
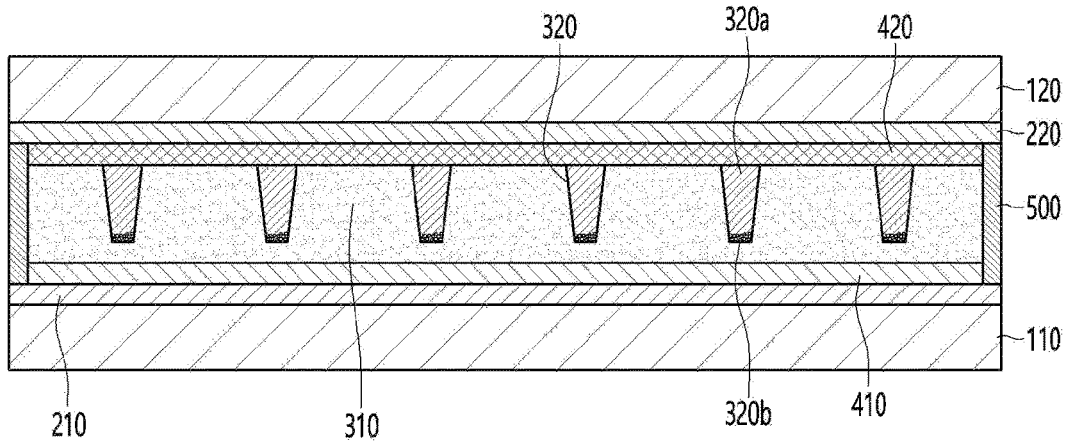
FIGS. 4 and 5 are views showing cross-sectional views of the light route control member according to the embodiment.
Figure 5:
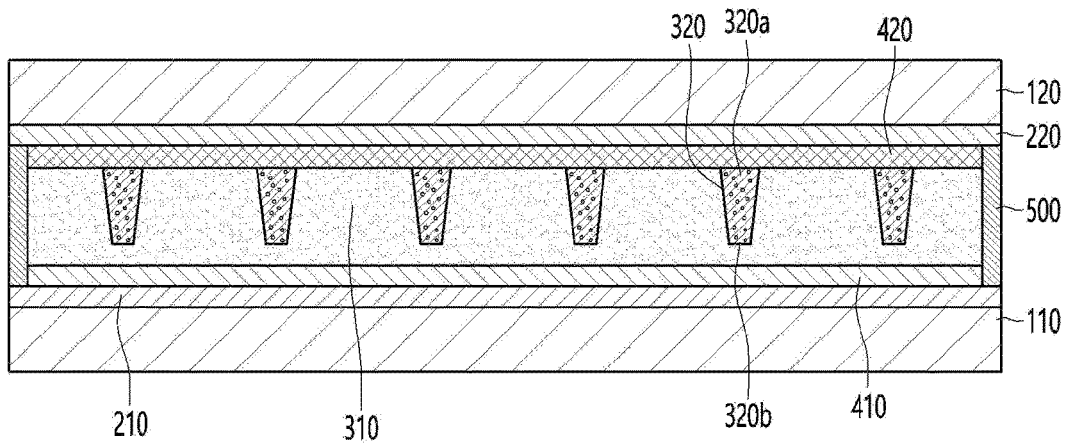

Referring to FIGS. 4 and 5, a buffer layer 410 for improving adhesion between the light conversion part 300 and the first electrode 210 is disposed between the light conversion part 300 and the first electrode 210. And, the light conversion part 300 and the second electrode 220, which are different materials, may be easily adhered to each other through the buffer layer 410.

In addition, the adhesive layer 420 may be disposed between the light conversion part 300 and the second electrode 220. The light conversion part and the second electrode 220 may be adhered through the adhesive layer 420.

The light conversion part 300 may include a partition wall part 310 and a receiving part 320.

The partition wall part 310 may be defined as a partition wall region that partitions the receiving part. That is, the partition wall part 310 is a partition wall region partitioning a plurality of receiving parts. And the receiving part 320 may be defined as a region that changes into a light blocking part and a light transmitting part according to the application of a voltage.

The partition wall part 310 and the receiving part 320 may be alternately disposed with each other. The partition wall part 310 and the receiving part 320 may be disposed to have different widths. For example, the width of the partition wall portion 310 may be greater than the width of the receiving part 320.

The partition wall part 310 and the receiving part 320 may be alternately disposed with each other. In detail, the partition wall part 310 and the receiving part 320 may be alternately disposed with each other. That is, each of the partition wall portions 310 may be disposed between the receiving parts 320 adjacent to each other, and each of the receiving parts 320 may be disposed between the adjacent partition wall portions 310.

The partition wall part 310 may contain a transparent material. The partition wall part 310 may contain a material that may transmit light.

The partition wall part 310 may contain a resin material. The partition wall part 310 may contain a photo-curable resin material. As an example, the partition wall part 310 may contain a UV resin or a transparent photoresist resin. Alternatively, the partition wall part 310 may contain urethane resin or acrylic resin.

The partition wall part 310 may transmit light incident on any one of the first substrate 110 and the second substrate 120 toward another substrate.

For example, in FIGS. 4 and 5, light may be emitted in the direction of the second substrate 120 and may be incident in the direction of the first substrate 110. The partition wall part 310 transmits the light, and the transmitted light may move in the direction of the second substrate 120.

A sealing part 500 sealing the light route control member may be disposed on a side surface of the partition wall part, and a side surface of the light conversion part 300 may be sealed by the sealing part.

The receiving part 320 may include a light conversion material 330 including a dispersion 320a and light conversion particles 320b. In detail, the dispersion 320a may be filled in the receiving part 320, and a plurality of light conversion particles 320b may be dispersed in the dispersion 330a.

The dispersion 320a may be a material for dispersing the light conversion particles 320b. The dispersion 320a may contain a transparent material. The dispersion 320a may contain a non-polar solvent. In addition, the dispersion 320a may contain a material capable of transmitting light. For example, the dispersion 320a may include at least one of a halocarbon-based oil, a paraffin-based oil, and isopropyl alcohol.

The light conversion particles 320b may be disposed to be dispersed in the dispersion 330a. In detail, the plurality of light conversion particles 320b may be disposed to be spaced apart from each other in the dispersion 330a.

The light conversion particles 320b may include a material capable of absorbing light. That is, the light conversion particle 320b may be a light absorbing particle. The light conversion particle 320b may have a color. For example, the light conversion particles 320b may have a black-based color. For example, the light conversion particles 320b may include carbon black particles.

The surface of the light conversion particle 320b may be charged. Accordingly, according to the application of the voltage, the light conversion particles 320b may move in one direction.

The light transmittance of the receiving part 320 may be changed by the light conversion particles 320b. In detail, the receiving part 320 may be changed into a light blocking part and a light transmitting part by changing the light transmittance by the light conversion particles 320b. That is, the receiving part 320 may change the transmittance of the light passing through the receiving part 320 by dispersion and aggregation of the light conversion particles 320b disposed therein in the dispersion 320a.

For example, the light path member according to the embodiment may be change from the first mode to the second mode or from the second mode to the first mode by a voltage applied to the first electrode 210 and the second electrode 220.

In detail, in the light route control member 1000 according to the embodiment, the receiving part 320 becomes the light blocking part in the first mode, and light of a specific angle may be blocked by the receiving part 320. That is, a viewing angle of the user viewing from the outside may be narrowed.

In addition, in the light route control member 1000 according to the embodiment, the receiving part 320 becomes the light transmitting part in the second mode, and in the light route control member according to the embodiment, light may be transmitted through both the partition wall part 310 and the receiving part 320. That is, the viewing angle of the user viewing from the outside may be widened.

Switching from the first mode to the second mode, that is, the conversion of the receiving part 320 from the light blocking part to the light transmitting part may be realized by movement of the light conversion particles 320b of the receiving part 320. That is, the light conversion particles 320b have electric charges on their surface, and may move in the direction of the first electrode 210 or the second electrode 220 by an applied voltage or by characteristics of the charge. That is, the light conversion particles 320b may be electrophoretic particles.

In detail, the receiving part 320 may be electrically connected to the first electrode 210 and the second electrode 220.

In this case, when a voltage is not applied to the light route control member from the outside, the light conversion particles 320b of the receiving part 320 are uniformly dispersed in the dispersion 330a, and light may be blocked by the light conversion particles in the receiving part 320. Accordingly, in the first mode, the receiving part 320 may be driven as the light blocking part.

Alternatively, when a voltage is applied to the light route control member from the outside, the light conversion particles 320b may move. For example, the light conversion particles 320b may move toward one end or the other end of the receiving part 320 by a voltage transmitted through the first electrode 210 and the second electrode 220. That is, the light conversion particles 320b may move from the receiving part 320 toward the first electrode or the second electrode.

In detail, when a voltage is applied to the first electrode 210 and/or the second electrode 220, an electric field is formed between the first electrode 210 and the second electrode 220. And, the light conversion particles 320b in a negatively charged state can be moved in the direction of the positively charged electrode among the first electrode 210 and the second electrode 220 using the dispersion 320a as a medium.

In detail, when a voltage is applied to the first electrode 210 and/or the second electrode 220, an electric field is formed between the first electrode 210 and the second electrode 220, and the charged carbon black, that is, the light conversion particles may be moved toward a positive electrode of the first electrode 210 and the second electrode 220 using the dispersion 320a as a medium.

That is, when the voltage is applied to the first electrode 210 and/or the second electrode 220, as shown in FIG. 4, the light conversion particles 320b may be moved toward the first electrode 210 in the dispersion 330a. That is, the light conversion particles 320b are moved in one direction, and the receiving part 320 may be driven as the light transmitting part.

In addition, when the voltage is not applied to the first electrode 210 and/or the second electrode 220, as shown in FIG. 5, the light conversion particles 320b may be uniformly dispersed in the dispersion 320a to drive the receiving part 30202 as the light blocking part.

Accordingly, the light route control member according to the embodiment may be driven in two modes according to a user's surrounding environment. That is, when the user requires light transmission only at a specific viewing angle, the receiving unit is driven as the light blocking part, or in an environment in which the user requires high brightness, a voltage may be applied to drive the receiving unit as the light transmitting part.

Therefore, since the light route control member according to the embodiment may be implemented in two modes according to the user's requirement, the light route control member may be applied regardless of the user's environment.

Meanwhile, in order to improve the shielding characteristics of the light route control member, the partition wall part 310 and the receiving part 320 may control refractive indices of the partition wall part 310 and the receiving part 320. In detail, the difference in refractive index between the partition wall part 310 and the receiving part 320 may be controlled in order to improve the shielding characteristics of the light route control member.

For example, the refractive index of the partition wall part 310 may be 1.64 or less. In detail, the refractive index of the partition wall part 310 may be 1.36 to 1.64. The refractive index of the partition wall part 310 may correspond to the refractive index of the resin composition constituting the partition wall part.

In addition, the refractive index of the receiving part 320 may be 1.45 or less. In detail, the refractive index of the receiving part 320 may be 1.40 to 1.45. The refractive index of the receiving part 320 may correspond to the refractive index of the dispersion 320a contained in the receiving part 320.

In this case, the refractive indices of the partition wall part 310 and the receiving part 320 may be the same or different from each other. For example, the refractive index of the partition wall part 310 may be the same as, smaller than, or greater than the refractive index of the receiving part 320.

In detail, the ratio of the refractive indices of the partition wall part 310 and the receiving part 320 may be 1:0.95 to 1:1.05. That is, the ratio of the refractive indices of the partition wall part 310 and the receiving part 320 may have the size ratio within the size range of the refractive indices of the partition wall part 310 and the receiving part 320.

The ratio of the refractive indices of the partition wall part 310 and the receiving part 320 is 1:0.95 to 1:1.05, so that diffraction, reflection, and refraction of light passing through the light conversion part 300 can be minimized. In detail, by minimizing the difference in refractive index between the partition wall part 310 and the receiving part 320, diffraction, reflection or refracting of light at the interface between the partition wall part 310 and the receiving part 320 is may be minimized.

Accordingly, the light incident from the partition wall part to the receiving part is not diffracted, reflected, or refracted at the interface between the partition wall part and the receiving part. Accordingly, it is possible to minimize the light from being absorbed by the receiving part and transmitted to the outside. Thereby, the shielding characteristic of the light route control member can be improved.

That is, in the first mode in which the receiving part 320 becomes a light blocking part, and blocks the light of a specific angle by the receiving part 320, diffraction, reflection, or refracting of light at the interface between the partition wall part and the receiving part may be minimized due to a difference in refractive index between the partition wall part and the receiving part. Accordingly, in the first mode, by diffracting, reflecting, or refracting light at the interface between the partition wall part and the receiving part, the light is not blocked and transmitted at different angles can be minimized. Thereby, the shielding characteristic of the light route control member can be improved.

Meanwhile, the refractive index of the partition wall part 310 and the refractive index of the receiving part 320 may have different sizes.

For example, the refractive index of the partition wall part 310 may be greater than that of the receiving part 320. In detail, the refractive index of the receiving part may be greater than that of the receiving part 320 and may be 1.05 times or less of the refractive index of the receiving part.

When the refractive index of the partition wall part exceeds 1.05 times the refractive index of the receiving part, due to a difference in refractive index between the partition wall part and the receiving part, the light may be refracted or scattered at the interface between the partition wall part and the receiving part, so that the blocking characteristic may be deteriorated.

In addition, since the refractive index of the partition wall part is greater than or equal to the size of the refractive index of the receiving part, total reflection of light moving from the partition wall part in the direction of the receiving part may be inhibited. In addition, it is possible to inhibit light in a specific angular direction from being transmitted without being absorbed by the receiving part.

In the light path control member, the refractive index of the partition wall part is greater than that of the receiving part 320 and is 1.05 times or less of the refractive index of the receiving part. Accordingly, the light route control member may reduce the transmittance of light transmitted at a specific angle, thereby improving the side shielding effect.

In detail, the light route control member controls the transmittance of the light transmitted at an angle of 45° with respect to the upper surface of the light conversion part 300 to be 12% or less, in detail, in the range of 7% to 12%. Thereby, the side shielding effect can be improved.

In addition, the light route control member controls the transmittance of the light transmitted at an angle of 30° and 60° with respect to the upper surface of the light conversion part 300 to be 27% or less, in detail, in the range of 13% to 27%. Thereby, the side shielding effect can be improved.

In addition, the light route control member controls the transmittance of the light transmitted at an angle of 40° and 50° with respect to the upper surface of the light conversion part 300 to be 15% or less, in detail, in the range of 8% to 15%. Thereby, the side shielding effect can be improved.

That is, the light route control member according to the embodiment may control the difference in refractive index between the partition wall part and the receiving part within a certain size range, thereby improving the shielding characteristics of light shielded through the receiving part. That is, at the interface between the partition wall part and the receiving part, light is not incident into the receiving part, and transmission of light by refraction, scattering, or reflection can be minimized. Accordingly, it is possible to reduce the transmittance of light at a specific angle, that is, a side angle.

Accordingly, the content of particles in the receiving part may be reduced, and the lateral transmittance may be reduced, thereby shortening the driving time of the light route control member.

Figure 6:
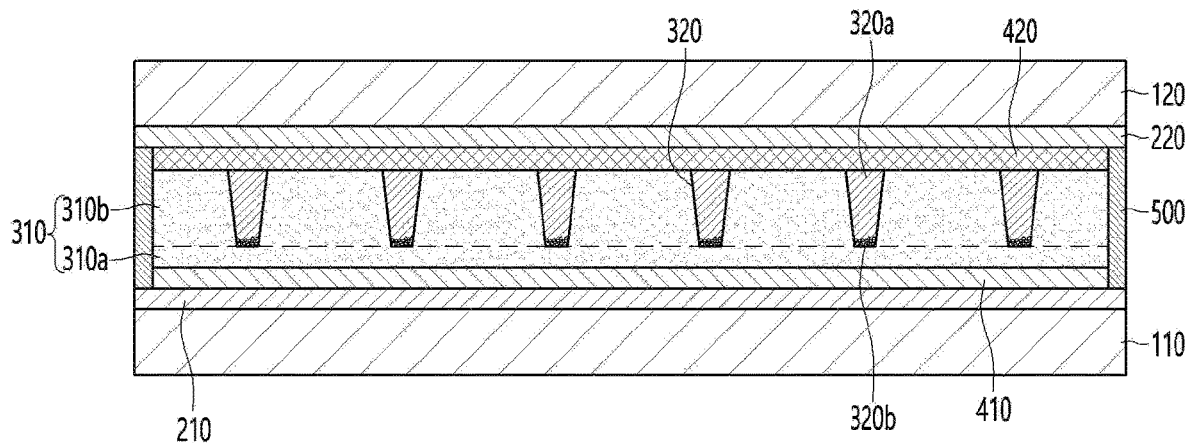
FIGS. 6 and 7 are views showing cross-sectional views of the light route control member according to another embodiment.
Figure 7:
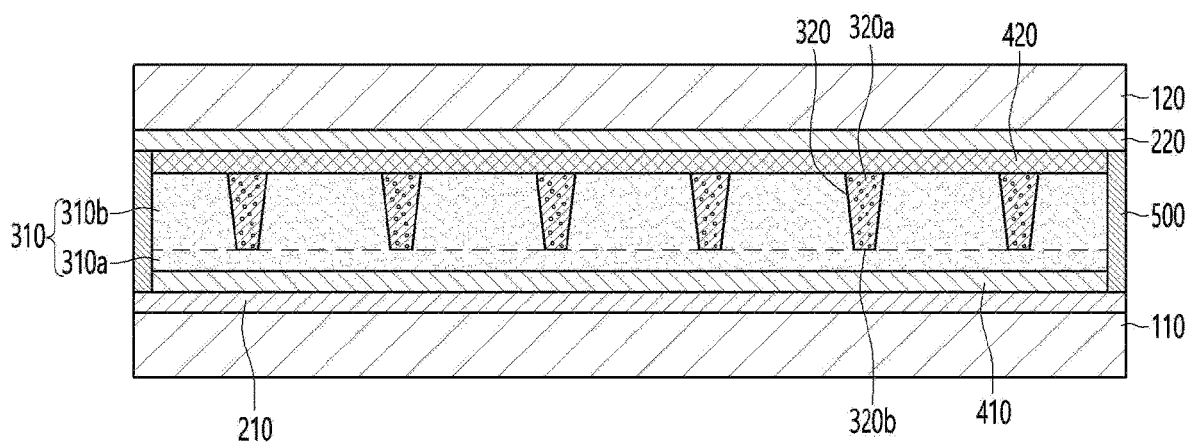

Meanwhile, referring to FIGS. 6 and 7, the partition wall part 310 may be defined as a first partition wall part 310a and a second partition wall part 310b according to positions.

For example, the first partition wall part 310a may be defined as a region between the first electrode 210 and the receiving part 320. That is, the first partition wall part 310a may be defined as a region between the upper surface of the first electrode 210 and the lower surface of the receiving part 320 among the partition wall regions.

Also, the second partition wall part 310b may be defined as a region between the first partition wall part 310a and the second electrode 220. That is, the second partition wall part 310b may be defined as an area between the receiving parts 320 in the area between the first partition wall part 310a and the second electrode 220 among the partition wall areas.

In addition, the first partition wall part 310a and the second partition wall part 310b may be defined as relative positions of the first electrode 210 and the second electrode 220.

In detail, the first partition wall part 310a may be defined as a partition wall part disposed closer to the first electrode 210 than the second electrode 220, and the second partition wall part 310b is the first electrode, and the second partition wall part 310b may be defined as a partition wall part disposed closer to the second electrode than the first electrode 210.

For example, the first partition wall portion 310a may be a base partition wall portion disposed close to the first electrode, and the second partition wall portion 310b may be a separation partition wall portion disposed close to the second electrode.

The first partition wall part 310a and the second partition wall part 310b may have the same or different refractive indices. In detail, the refractive index of the second partition wall portion 310b may be the same as or less than that of the first partition wall portion 310a.

That is, when the light passing through the light route control member according to the embodiment is transmitted from the direction of the second substrate to the direction of the first substrate, the refractive index of the second partition wall part 310b through which the light first passes may be the same as or less than that of the first partition wall part 310a.

Accordingly, since the light passing through the light conversion part of the light route control member moves from a region having a low refractive index to a region having a high refractive index, total reflection of light may be inhibited, thereby reducing light loss due to total reflection.

Accordingly, the front luminance of the light route control member according to the embodiment may be improved.

In addition, the first partition wall part 310a, the second partition wall part 310b, and the receiving part 320 may have different refractive indices. For example, the ratio of the first partition wall part 310a, the second partition wall part 310b, and the receiving part 320 may satisfy a range of 0.9 to 1:0.95 to 1.05:1.

Accordingly, the difference in refractive index between the first and second partition walls 310a and 310b is controlled to inhibit total reflection at the interface between the first and second partition walls 310a and 310b may be inhibited. Thereby, it is possible to improve the front luminance. And, refraction, scattering, or reflection of light at the interface between the second partition wall part 310b and the receiving part 320 can be inhibited by controlling the difference in refractive index between the second partition wall part 310b and the receiving part 320. Accordingly, it is possible to reduce the transmittance of light transmitted at a specific angle. Thereby, the side shielding effect of the light route control member can be improved.

FIGS. 8 to 11 are views illustrating other cross-sectional views of a light route control member according to an embodiment.

Figure 8:
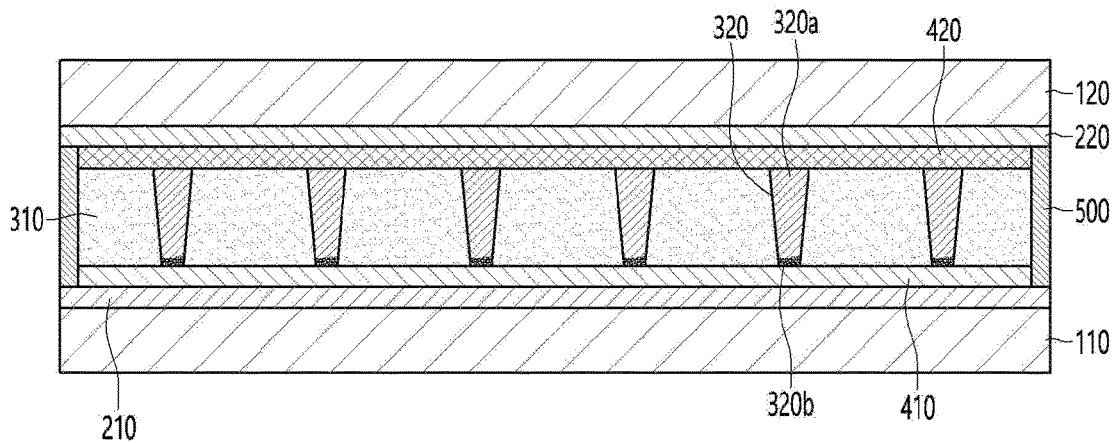
FIGS. 8 to 11 are views showing various cross-sectional views of the light route control member according to the embodiments.
Figure 9:
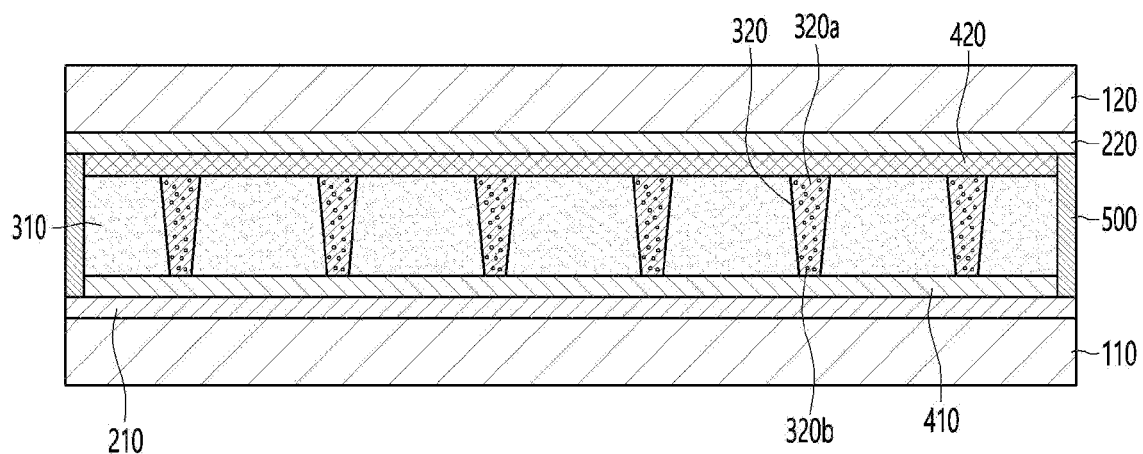

Referring to FIGS. 8 and 9, in the light route control member according to the embodiment, the receiving part 320 may be disposed in contact with the electrode differently from FIGS. 4 and 5.

For example, the receiving part 320 may be disposed in direct contact with the first electrode 210.

Accordingly, since the first electrode 210 and the receiving part 320 are not spaced apart and are arranged in direct contact with each other, the voltage applied from the first electrode 210 may be easily transferred to the receiving part 320.

Accordingly, the moving speed of the light conversion particle 320b inside the receiving part 320 may be improved, and thus the driving characteristics of the light route control member may be improved.

Figure 10:
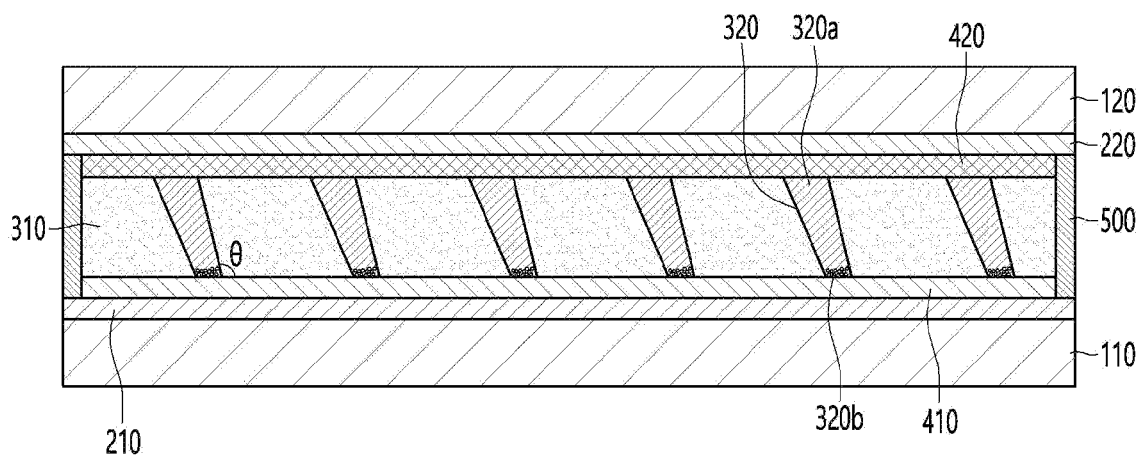
Figure 11:
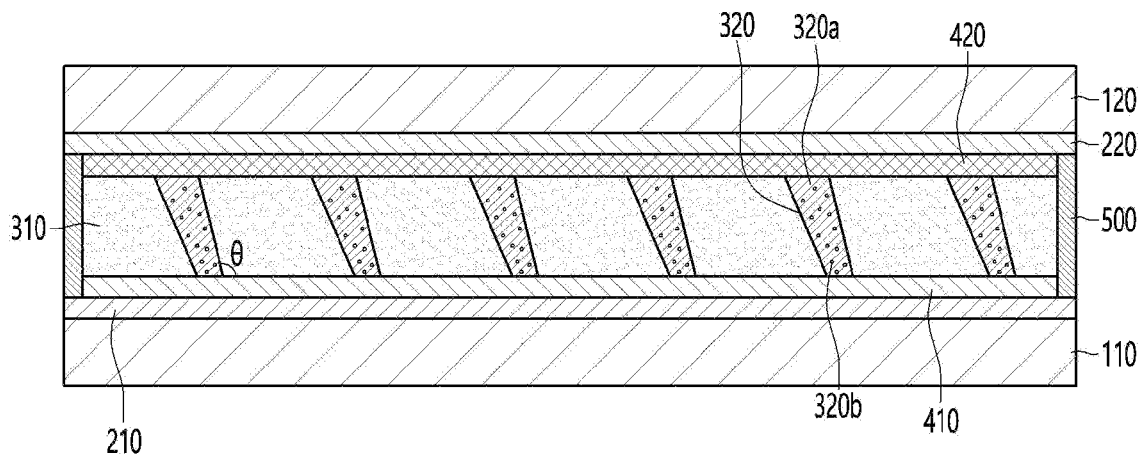

In addition, referring to FIGS. 10 and 11, in the light route control member according to the embodiment, unlike FIGS. 4 and 5, the receiving part 320 may be disposed while having a constant inclination angle θ.

In detail, referring to FIGS. 10 and 11, the receiving part 320 may be disposed while having an inclination angle θ of greater than 0° to less than 90° with respect to the first electrode 210. In detail, the receiving part 320 may extend upwardly while having an inclination angle θ of greater than 0° to less than 90° with respect to one surface of the first electrode 210.

Accordingly, when the light route member is used together with the display panel, moire caused by the overlapping phenomenon between the pattern of the display panel and the receiving part 320 of the light route member may be inhibited, thereby improving user visibility.

Hereinafter, a light route control member according to another embodiment will be described with reference to FIGS. 12 to 14. In the description of the light route control member according to another embodiment, descriptions that are similar to those of the light route control member according to the above-described embodiment will be omitted, and the same reference numerals will be given to the same components.

As described above, a buffer layer 410 for easy adhesion between the first electrode 210 and the light conversion part 300 may be disposed between the first electrode 210 and the light conversion part 300.

The buffer layer 410 may have conductivity. In detail, the buffer layer 410 disposed on the first electrode 210 may have conductivity. Accordingly, when an electrode is additionally disposed on the buffer layer 410, the current applied from the first electrode 210 may flow to the additional electrode through the buffer layer 410.

Referring to FIG. 6, the buffer layer 410 may include conductive particles 411. In detail, the buffer layer may include a plurality of conductive particles. That is, the buffer layer 410 may be formed by stacking a plurality of conductive particles 411.

The conductive particles 411 may be formed of nano-sized particles. In detail, the conductive particles 411 may be formed to have a particle diameter of 100 nm or less. In detail, the conductive particles 411 may be formed to have a particle diameter of 10 nm to 100 nm.

When the particle diameter of the conductive particles 411 exceeds 100 nm, the conductivity of the buffer layer of a certain thickness may be reduced. Accordingly, in order to satisfy the conductivity of a certain size, the thickness of the buffer layer may be increased to increase the overall thickness of the light route control member.

The conductive particles 411 may include an inorganic material. In detail, the conductive particles 411 may include a metal oxide such as titanium dioxide (TiO2), zinc oxide (ZnO2), germanium oxide (GeO2), and molybdenum dioxide (MoO2).

Since the conductive particles 411 include metal oxide particles, the buffer layer 410 can be easily applied on the first electrode 210 including a metal, and can be easily adhered to the buffer layer 410.

The buffer layer 410 may have conductivity due to a plurality of conductive particles constituting the buffer layer 410. Accordingly, even when a connection electrode for connecting an external power source is directly disposed on the buffer layer 410, electricity may be conducted with the first electrode 210 through the buffer layer 410.

A functional group (R) may be connected to an end of the conductive particle 411. In detail, a hydrophilic functional group may be connected to an end of the conductive particle 411. In more detail, hydrophilic functional groups of —NH, —OH, and —COOH may be connected to the ends of the conductive particles 411.

The buffer layer 350 may be formed by immersing the first substrate on which the first electrode is disposed in a precursor solution forming the buffer layer.

In detail, first, the precursor material forming the buffer layer may be mixed with water to react the precursor material with water. As an example, the buffer layer may include titanium dioxide conductive particles. Hereinafter, a process of forming the titanium dioxide conductive particles will be mainly described.

The precursor material may include Tetra isopropyl titanate (TTIP), Tetrabutyl titanate (TBT), or Titanium tetrachloride (TiCl4) represented by the following structural formula.

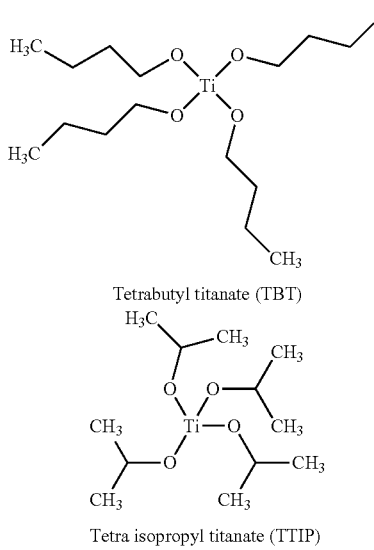

Tetrabutyl titanate (TBT)

Tetra isopropyl titanate (TTIP)

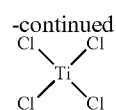

Titanium tetrachloride (TiCl4)

These precursor materials can be mixed with water to react with water. In this case, the reaction between the precursor material and water may proceed by the following mechanism.

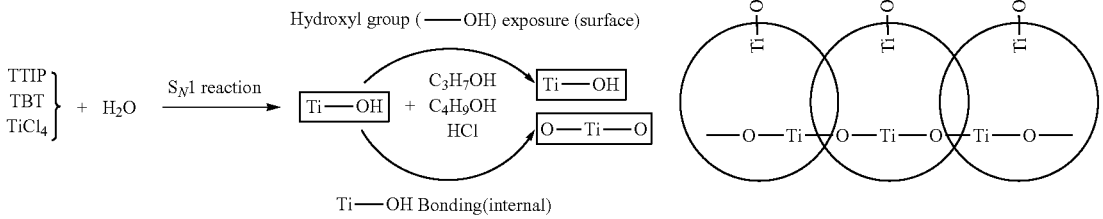

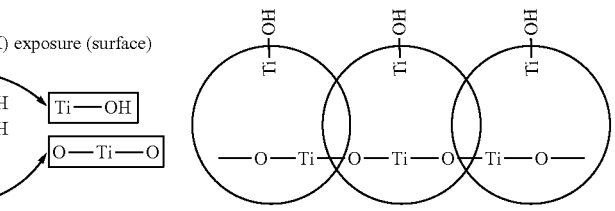

That is, the precursor material may react with water to be converted into Ti—OH, which is easily combined, and may undergo condensation polymerization with TiO2.

In this case, the —OH group is exposed through the unreacted portion, so that the conductive particles may have hydrophilicity. The amount of the —OH group can be controlled according to the synthesis conditions, and the degree of hydrophilicity can be controlled by changing the synthesis conditions according to the degree of hydrophilicity to be implemented.

Then, the first substrate on which the first electrode is disposed is immersed in a solution in which the precursor material and water are mixed, and then heated at a temperature of about 70° C. to about 90° C. for about 20 minutes to about 40 minutes. Accordingly, a buffer layer including conductive particles to which the hydrophilic functional group is bonded may be formed on the first electrode.

Then, the surface of the buffer layer may be washed with ethanol to finally form the buffer layer.

Since the buffer layer 410 includes the conductive particles 351 having the hydrophilic functional group, adhesion to the resin material constituting the light conversion part disposed on the first electrode 210 may be improved.

That is, since the buffer layer 410 includes a metal material that is the same material as the first electrode, adhesion with the first electrode can be improved. Also, since the buffer layer 410 includes conductive particles having hydrophilicity, it is possible to improve adhesion with a resin material constituting the light conversion part.

Accordingly, the first electrode, which is a heterogeneous material, and the resin material constituting the light conversion part are adhered through the buffer layer 410, thereby improving the adhesion between the first electrode and the resin material.

In addition, since the buffer layer 410 has conductivity, a separate process for removing the buffer layer may not be required to form a connection electrode connecting the external power source and the light route control member.

Figure 12:
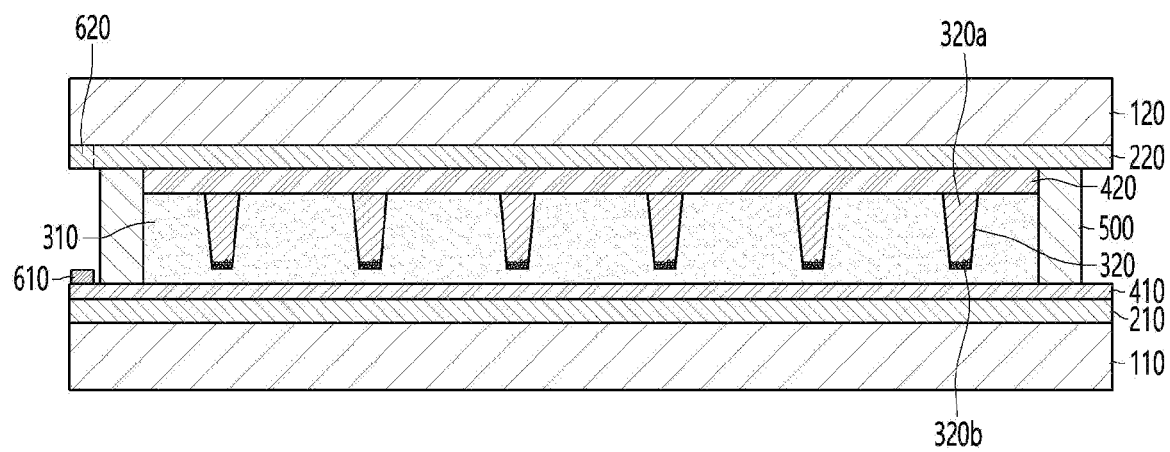
FIGS. 12 and 13 are views showing cross-sectional views of the light route control member according to another embodiment.
Figure 13:
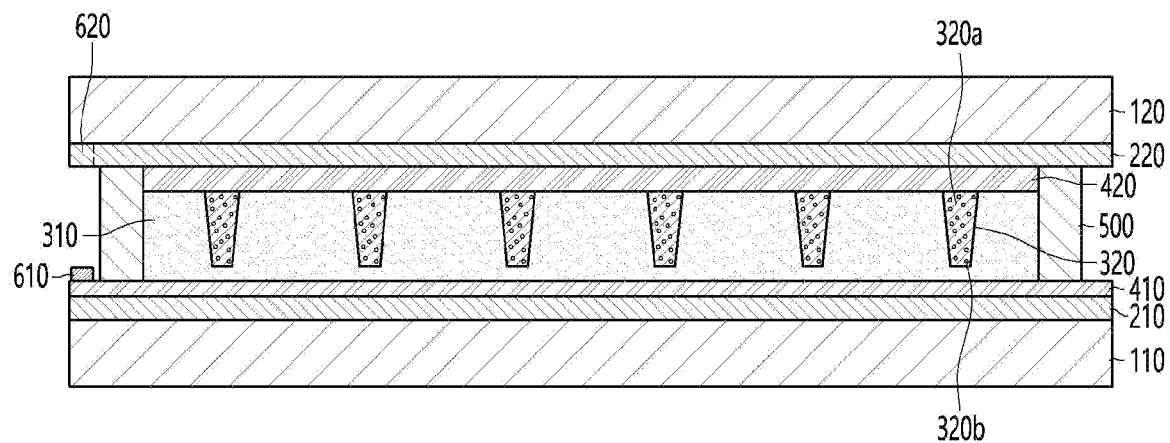
Figure 14:
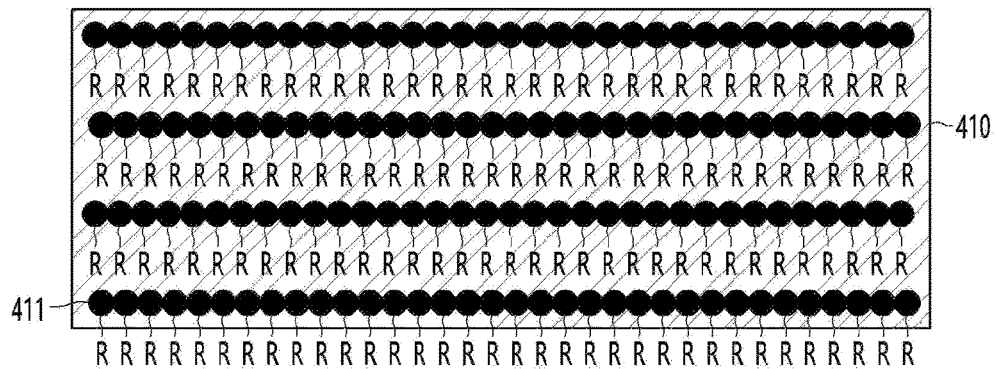
FIG. 14 is a view showing enlarged view of a buffer layer of a light route control member according to another embodiment.

Referring to FIGS. 12 and 13, a connection electrode for connecting an external power source and a light route control member may be disposed on the first substrate 110.

The connection electrode may include a first connection electrode 610 disposed on the first substrate 110 and a second connection electrode 620 disposed under the second substrate 120.

The first connection electrode 610 may be disposed on the buffer layer 410 disposed on the first substrate 110. The first connection electrode 610 may be disposed in direct contact with the buffer layer 410.

Also, the second connection electrode 620 may be disposed under the second substrate 120. The second connection electrode 620 may include the same material as the second electrode 220. In detail, the second connection electrode 620 may be integrally formed with the second electrode 220. That is, the second connection electrode 620 may be formed by removing a portion of the adhesive layer 410 as a pad portion of the second electrode 220 to expose the second electrode 220. The connection electrode 610 may include a conductive material. For example, the first connection electrode 610 may be formed by applying a silver (Ag) paste on the buffer layer 410.

A wire connected to an external power supply may be connected to the first connection electrode 610 and the second connection electrode 620. Accordingly, the voltage applied from the external power supply is transmitted to the light route control member through the first connection electrode 610 and the second connection electrode 620, and the voltage can be applied to the inside of the receiving part.

On the other hand, the buffer layer 410 may be formed in a certain thickness range to conduct electricity between the connection electrode and the electrode. In detail, the buffer layer 410 may be formed to a thickness of about 4 μm or less.

When the thickness of the buffer layer 410 exceeds about 4 μm, the resistance of the buffer layer 410 may increase due to an increase in the thickness of the buffer layer 410, and thus conductivity of the buffer layer may be reduced.

The light route control member according to another embodiment may include a buffer layer disposed between the light conversion part including the resin material and the electrode including the metal material.

Accordingly, it is possible to inhibit a decrease in adhesive strength due to the dissimilar material when the light conversion part and the electrode are bonded to each other.

That is, since the buffer layer including conductive metal particles improves adhesion to the electrode, which is the same material, the conductive particles constituting the buffer layer include a hydrophilic functional group that improves adhesion to the resin material. Accordingly, it is possible to improve the adhesion to the light conversion part including the resin material.

Accordingly, when the light conversion part and the electrode, which are different materials, are bonded to each other, adhesive properties can be improved, and thus, it is possible to inhibit the light conversion part from being removed from the electrode, thereby reducing reliability.

In addition, since the buffer layer includes conductive metal particles, when disposing the connection electrode connecting the light route control member and the external power supply, the connection electrode may be disposed directly on the buffer layer.

That is, a separate process for removing the buffer layer may be omitted by directly disposing the connection electrode on the buffer layer without removing the buffer layer.

In addition, it is possible to inhibit stains generated while removing the buffer layer. Accordingly, it is possible to improve visibility by inhibiting the stains in the process from being visually recognized from the outside.

Hereinafter, the present invention will be described in more detail through the transmittance of the light route control member according to the embodiments. These embodiments are merely presented as examples in order to explain the present invention in more detail. Therefore, the present invention is not limited to these examples.

Example 1

A light path control member was manufactured.

In detail, the first electrode was disposed on the first substrate, and the second electrode was disposed on the second substrate. Then, a light conversion part including a partition wall part and a receiving part was disposed on the first electrode and adhered, and the second substrate and the second electrode is disposed and adhered on the light conversion part to form a light route control member.

At this time, the size of the refractive index of the receiving part is 1.448, and the size of the refractive index of the partition wall is 1.487.

Then, the lateral transmittance of the light route control member at 30°, 40°, 45°, 50°, and 60° was measured.

Example 2

After the light route control member was manufactured in the same manner as in Example 1, except that the size of the refractive index of the partition wall part is 1.485. Then, the lateral transmittance of the light path control member at 30°, 40°, 45°, 50°, and 60° was measured.

Example 3

After the light route control member was manufactured in the same manner as in Example 1, except that the size of the refractive index of the partition wall part is 1.483. Then, the lateral transmittance of the light path control member at 30°, 40°, 45°, 50°, and 60° was measured.

Example 4

After the light route control member was manufactured in the same manner as in Example 1, except that the size of the refractive index of the partition wall part is 1.480. Then, the lateral transmittance of the light path control member at 30°, 40°, 45°, 50°, and 60° was measured.

Example 5

After the light route control member was manufactured in the same manner as in Example 1, except that the size of the refractive index of the partition wall part is 1.492. Then, the lateral transmittance of the light path control member at 30°, 40°, 45°, 50°, and 60° was measured.

TABLE 1

|  | Refractive index of partition wall part/ Refractive index of receiving part | 30°/50° Trans- mittance | 40°/50° Trans- mittance | 45° Trans- mittance |
| --- | --- | --- | --- | --- |
| Example1 | 1.027 | 13.1% | 8.0% | 7.8% |
| Example2 | 1.025 | 13.8% | 8.4% | 7.9% |
| Example3 | 1.034 | 12.4% | 7.2% | 6.9% |
| Example4 | 1.022 | 11.3% | 6.1% | 4.4% |
| Example5 | 1.030 | 27.2% | 14.8% | 12.0% |

Referring to Table 1, the light route control member according to the embodiments may effectively control the lateral transmittance at 30°, 40°, 45°, 50°, and 60°.

Especially. By effectively reducing the light transmittance of 45°, which is the optimal viewing angle of the first mode for implementing the privacy mode, side shielding of the light route member can be effectively implemented in the first mode.

Hereinafter, referring to FIGS. 15 to 19, a display device and a display apparatus to which the light route control member according to an embodiment is applied will be described.

Figure 15:
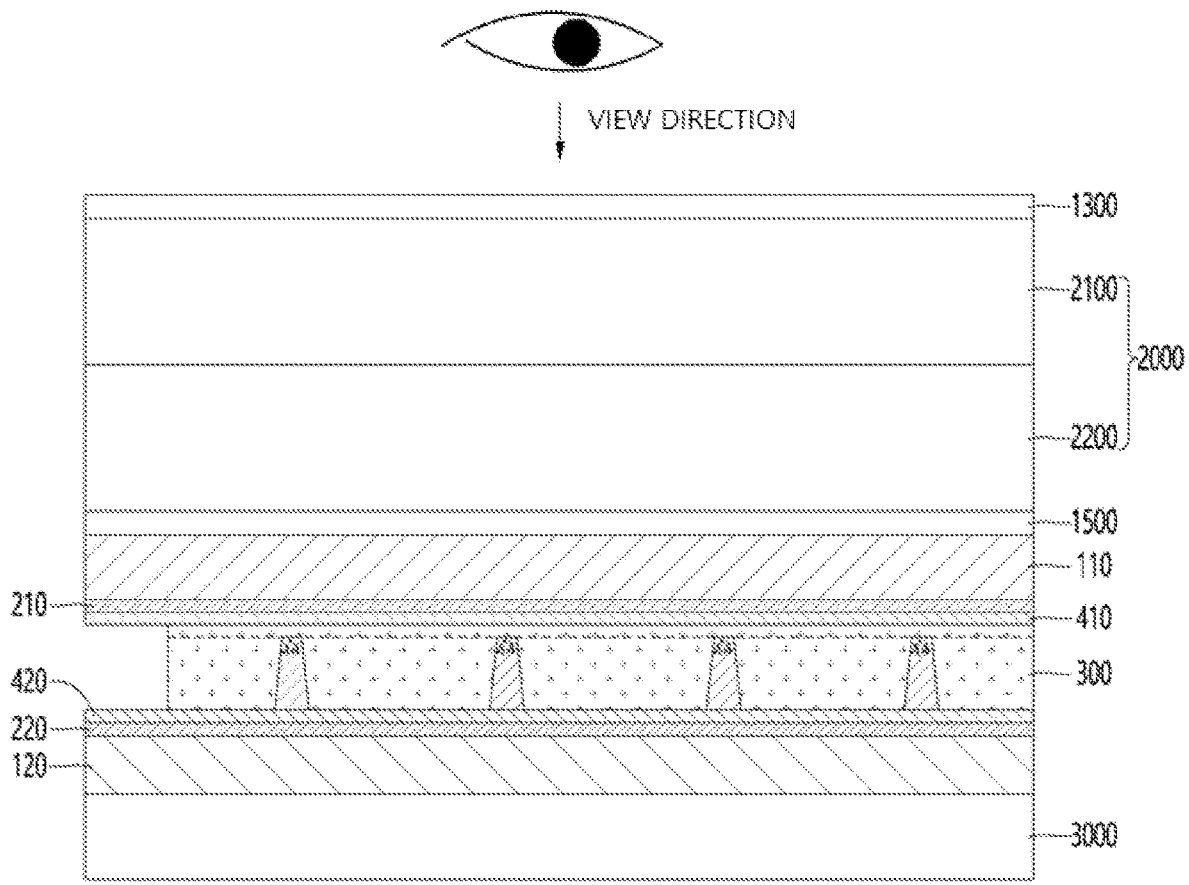
FIGS. 15 and 16 are views showing cross-sectional views of a display device to which a light route control member according to an embodiment is applied.
Figure 16:
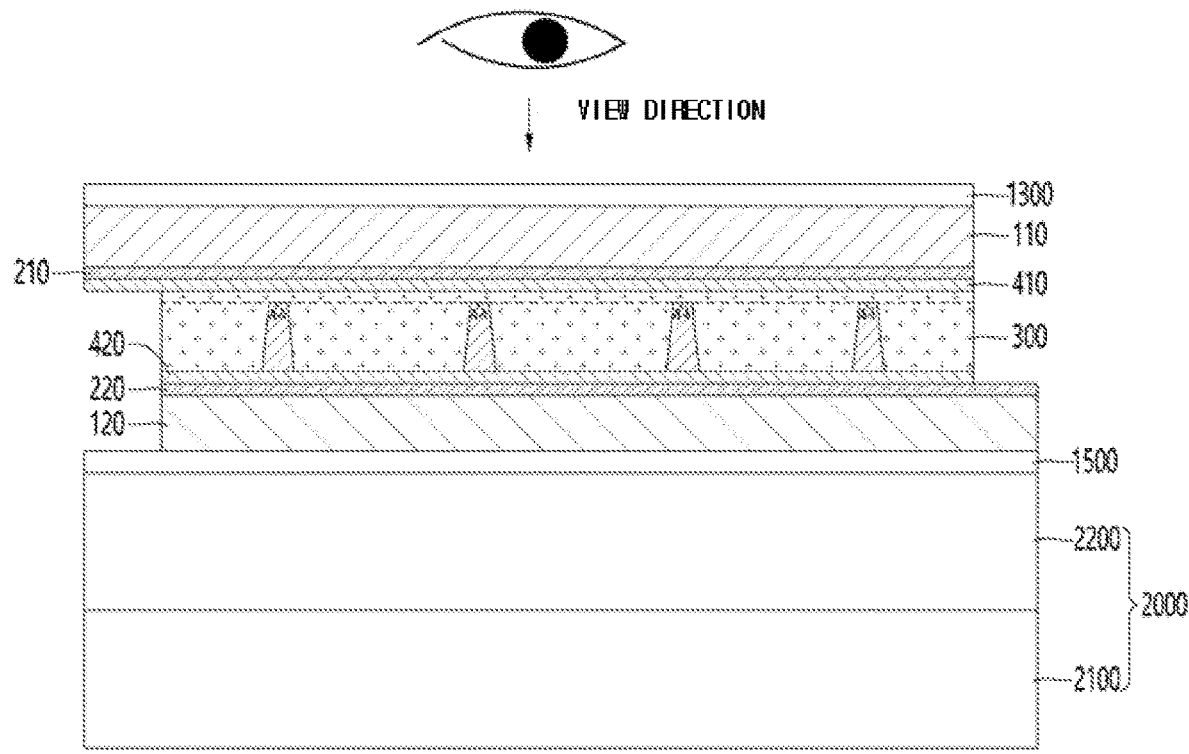

Referring to FIGS. 15 and 16, the light route control member 1000 according to an embodiment may be disposed on a display panel 2000.

The display panel 2000 and the light route control member 1000 may be disposed to be adhered to each other. For example, the display panel 2000 and the light route control member 1000 may be adhered to each other via an adhesive layer 1500. The adhesive layer 1500 may be transparent. For example, the adhesive layer 1500 may include an adhesive or an adhesive layer containing an optical transparent adhesive material.

The adhesive layer 1500 may include a release film. In detail, when adhering the light route control member and the display panel, the light route control member and the display panel may be adhered after the release film is removed.

The display panel 2000 may include a first substrate 2100 and a second substrate 2200. When the display panel 2000 is a liquid crystal display panel, the display panel 2000 may be formed in a structure in which the first substrate 2100 including a thin film transistor (TFT) and a pixel electrode and the second substrate 2200 including color filter layers are bonded with a liquid crystal layer interposed therebetween.

In addition, the display panel 2000 may be a liquid crystal display panel of a color filter on transistor (COT) structure in which a thin film transistor, a color filter, and a black matrix are formed at the first substrate 2100 and the second substrate 2200 is bonded to the first substrate 2100 with the liquid crystal layer interposed therebetween. That is, a thin film transistor may be formed on the first substrate 2100, a protective film may be formed on the thin film transistor, and a color filter layer may be formed on the protective film. In addition, a pixel electrode in contact with the thin film transistor may be formed on the first substrate 2100. At this point, in order to improve an aperture ratio and simplify a masking process, the black matrix may be omitted, and a common electrode may be formed to function as the black matrix.

In addition, when the display panel 2000 is the liquid crystal display panel, the display device may further include a backlight unit providing light from a rear surface of the display panel 2000.

Alternatively, when the display panel 2000 is an organic light emitting display panel, the display panel 2000 may include a self-luminous element that does not require a separate light source. In the display panel 2000, a thin film transistor may be formed on the first substrate 2100, and an organic light emitting element in contact with the thin film transistor may be formed. The organic light emitting element may include an anode, a cathode, and an organic light emitting layer formed between the anode and the cathode. Further, the second substrate 2200 configured to function as an encapsulation substrate for encapsulation may further be included on the organic light emitting element.

Furthermore, although not shown in drawings, a polarizing plate may be further disposed between the light route control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is the organic light emitting display panel, the polarizing plate may be the external light reflection preventive polarizing plate.

In addition, an additional functional layer 1300 such as an anti-reflection layer, an anti-glare, or the like may be further disposed on the light route control member 1000. Specifically, the functional layer 1300 may be adhered to one surface of first substrate 110 of the light route control member. Although not shown in drawings, the functional layer 1300 may be adhered to the first substrate 110 of the light route control member via an adhesive layer. In addition, a release film for protecting the functional layer may be further disposed on the functional layer 1300.

Further, a touch panel may be further disposed between the display panel and the light route control member.

Although it is shown in the drawings that the light route control member is disposed at an upper portion of the display panel, but the embodiment is not limited thereto, and the light route control member may be disposed at various positions such as a position in which light is adjustable, that is, a lower portion of the display panel, between a second substrate and a first substrate of the display panel, or the like.

Figure 19:
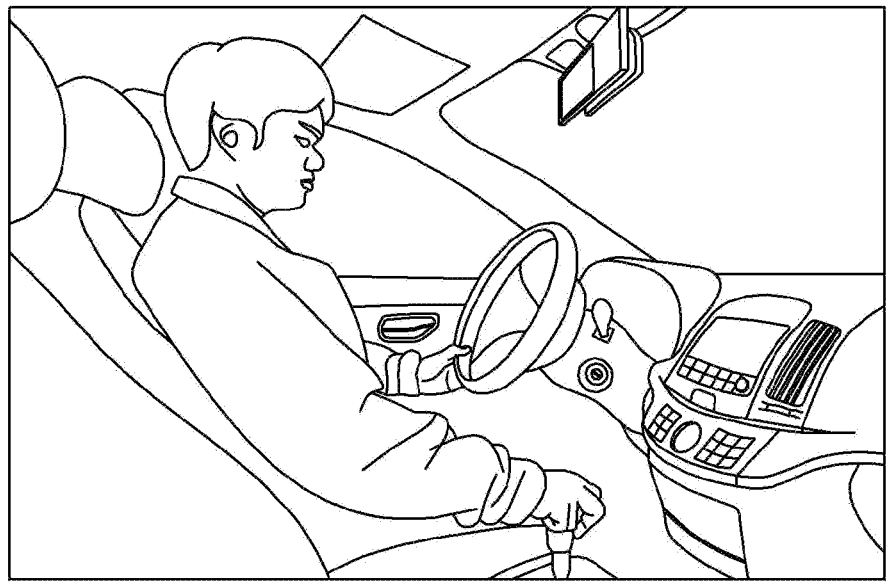

Referring to FIG. 19, the light route control member according to the embodiment may be applied to a vehicle.

Figure 17:
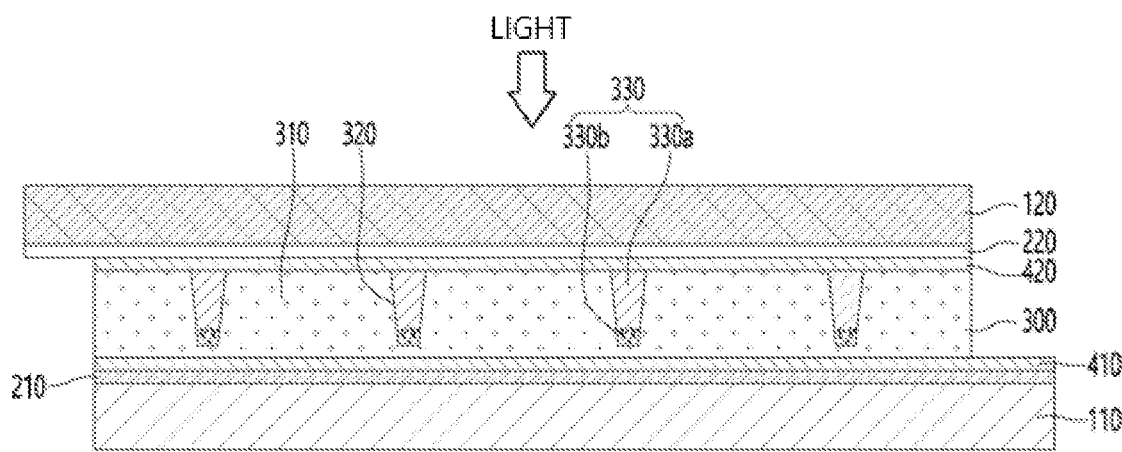
FIGS. 17 to 19 are views for describing one embodiment of the display device to which the light route control member according to the embodiment is applied.
Figure 17:
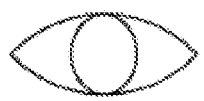
Figure 17:
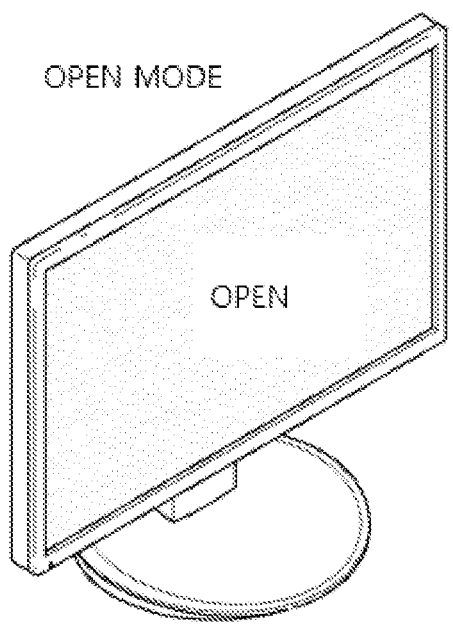
Figure 18:
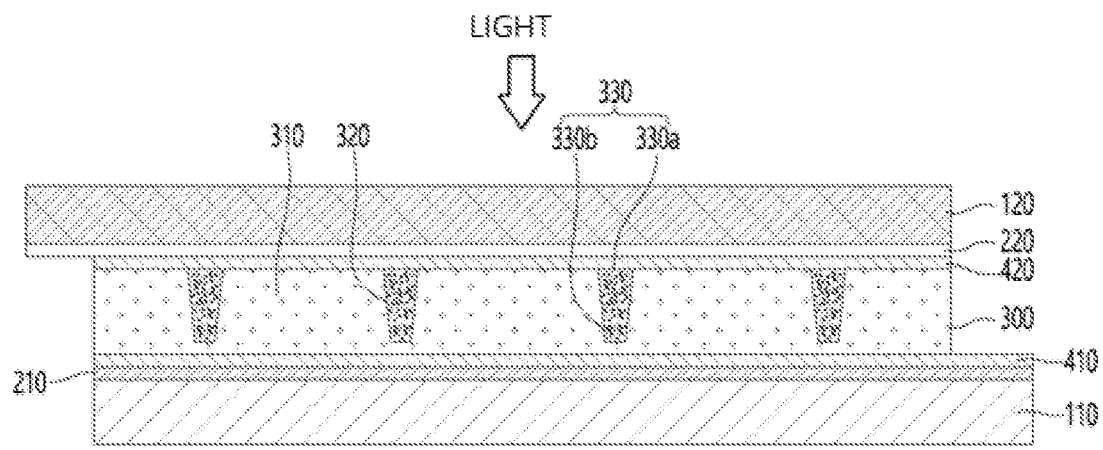
Figure 18:
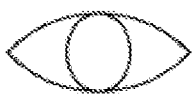
Figure 18:
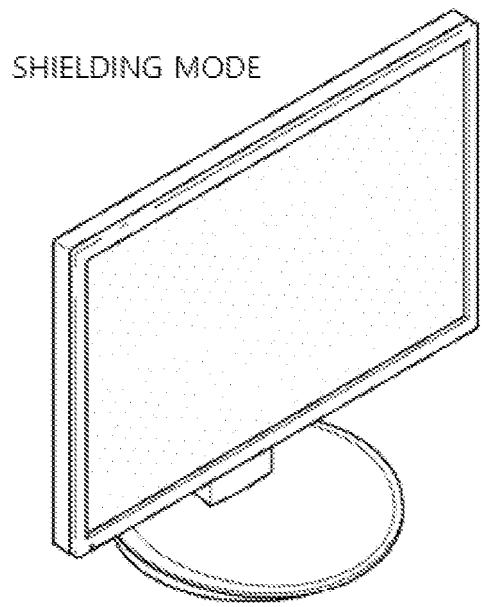

Referring to FIGS. 17 and 18, the light route control member according to the embodiment may be applied to a display device displaying a display.

For example, when power is not applied to the light route control member as shown in FIG. 18, the receiving unit functions as the light blocking part, so that the display device is driven in a light blocking mode, and when power is applied to the light route control member as shown in FIG. 17, the receiving unit functions as the light transmitting part, so that the display device may be driven in an open mode.

Accordingly, a user may easily drive the display device in a privacy mode or a normal mode according to application of power.

In addition, referring to FIG. 19, the display device to which the light route control member according to the embodiment is applied may also be applied inside the vehicle.

For example, the display device including the light route control member according to the embodiment may display a video confirming information of the vehicle and a movement route of the vehicle. The display device may be disposed between a driver seat and a passenger seat of the vehicle.

In addition, the light route control member according to the embodiment may be applied to a dashboard that displays a speed, an engine, an alarm signal, and the like of the vehicle.

Furthermore, the light route control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. A light route control member comprising:
a first substrate;
a first electrode disposed on the first substrate;
a second substrate disposed on the first substrate;
a second electrode disposed under the second substrate; and
a light conversion part disposed between the first electrode and the second electrode,
wherein the light conversion part includes a partition wall part and a receiving part that are alternately arranged,
wherein the light transmittance is changed according to an application of voltage to the receiving part,
wherein the receiving part includes a dispersion and light conversion particles dispersed in the dispersion,
wherein a refractive index of the partition wall part is 1.36 to 1.64,
wherein a refractive index of the receiving part is 1.40 to 1.45,
wherein a ratio of the refractive indexes of the partition wall part and the receiving part is 1:0.95 to 1:1.05,
wherein the partition wall part includes: a first partition wall part disposed closer to the first electrode than to the second electrode; and a second partition wall part disposed closer to the second electrode than to the first electrode, and
wherein refractive indexes of the first partition wall part and the second partition wall part are different.

2. The light route control member of claim 1, wherein the refractive index of the receiving part corresponds to the refractive index of the dispersion,
wherein the refractive index of the first partition wall part or the second partition wall part corresponds to the refractive index of a resin composition constituting the partition wall part.

3. The light route control member of claim 1, wherein the refractive index of the first partition wall part or the second partition wall part is greater than the refractive index of the receiving part.

4. The light route control member of claim 3, wherein a transmittance of light transmitted at an angle of 45° with respect to the upper surface of the light conversion part is 7% to 12%.

5. The light route control member of claim 3, wherein a transmittance of light transmitted at angles of 30° and 60° with respect to the upper surface of the light conversion unit is 13% to 27%.

6. The light route control member of claim 3, wherein a transmittance of light transmitted at angles of 40° and 50° with respect to the upper surface of the light conversion unit is 8% to 15%.

7. The light route control member of claim 1, wherein the first partition wall part is defined as a region between an upper surface of the first electrode and a lower surface of the receiving part,
wherein the second partition wall part is defined as a region between the receiving parts.

8. The light route control member of claim 7, wherein a light passes from the second substrate to the first substrate.

9. The light route control member of claim 8,
wherein the refractive index of the second partition wall part is equal to or less than the refractive index of the first partition wall part.

10. The light route control member of claim 1, comprising a buffer layer disposed between the first electrode and the light conversion part,
wherein the buffer layer includes a plurality of conductive particles.

11. The light route control member of claim 10, wherein the plurality of conductive particles have a particle diameter of 10 nm to 100 nm.

12. The light route control member of claim 10, wherein a hydrophilic functional group is connected to an end of each conductive particle of the plurality of conductive particles.

13. A display device comprising:
a display panel; and
a light route control member disposed on the display panel;
wherein the light route control member includes:
a first substrate;
a first electrode disposed on the first substrate;
a second substrate disposed on the first substrate;
a second electrode disposed under the second substrate; and
a light conversion part disposed between the first electrode and the second electrode,
wherein the light conversion part includes a partition wall part and a receiving part that are alternately arranged,
wherein the light transmittance is changed according to an application of voltage to the receiving part,
wherein the receiving part includes a dispersion and light conversion particles dispersed in the dispersion,
wherein a refractive index of the partition wall part is 1.36 to 1.64,
wherein a refractive index of the receiving part is 1.40 to 1.45,
wherein a ratio of the refractive indexes of the partition wall part and the receiving part is 1:0.95 to 1:1.05,
wherein the partition wall part includes: a first partition wall part disposed closer to the first electrode than to the second electrode; and a second partition wall part disposed closer to the second electrode than to the first electrode, and
wherein refractive indexes of the first partition wall part and the second partition wall part are different.

14. The display device of claim 13,
wherein a ratio of the refractive indexes of the first partition wall, the second partition wall part, and the receiving part is 0.9-1:0.95-1.05:1.

15. The light route control member of claim 13, wherein the refractive index of the second partition wall part is different from the refractive index of the receiving part.

16. The light route control member of claim 15, wherein a ratio of refractive indexes of the first partition wall part, the second partition wall part, and the receiving part is 0.9-1: 0.95-1.05:1.

* * * * *